United States Patent
Kato

(10) Patent No.: US 12,482,067 B2
(45) Date of Patent: Nov. 25, 2025

(54) OUTLINE CORRECTION PROCESSING DEVICE AND OUTLINE CORRECTION PROCESSING METHOD

(71) Applicant: KOKUSAI DENKI Electric Inc., Tokyo (JP)

(72) Inventor: Akihiro Kato, Tokyo (JP)

(73) Assignee: KOKUSAI DENKI Electric Inc., Tokyo (JP)

( * ) Notice: Subject to any disclaimer, the term of this patent is extended or adjusted under 35 U.S.C. 154(b) by 0 days.

(21) Appl. No.: 19/105,560

(22) PCT Filed: Sep. 8, 2022

(86) PCT No.: PCT/JP2022/033633
§ 371 (c)(1),
(2) Date: Feb. 21, 2025

(87) PCT Pub. No.: WO2024/053033
PCT Pub. Date: Mar. 14, 2024

(65) Prior Publication Data
US 2025/0265678 A1    Aug. 21, 2025

(51) Int. Cl.
*G06T 5/20* (2006.01)
*G06T 11/00* (2006.01)

(52) U.S. Cl.
CPC .............. *G06T 5/20* (2013.01); *G06T 11/001* (2013.01); *G06T 2207/10024* (2013.01); *G06T 2207/30196* (2013.01)

(58) Field of Classification Search
CPC ..................... G06T 5/20; G06T 11/001; G06T 2207/10024; G06T 2207/30196
See application file for complete search history.

(56) References Cited

U.S. PATENT DOCUMENTS

| 5,905,532 A | 5/1999 | Ito et al. |
| 8,957,999 B2 * | 2/2015 | Sun ...................... H04N 23/843 |
| | | 348/252 |
| 9,495,582 B2 * | 11/2016 | Guissin .................... G06T 5/20 |

FOREIGN PATENT DOCUMENTS

| JP | H05-030459 A | 2/1993 |
| JP | H08-294020 A | 11/1996 |

(Continued)

OTHER PUBLICATIONS

Search Report mailed Nov. 1, 2022 in International Application No. PCT/JP2022/033633.

(Continued)

*Primary Examiner* — Phuoc Tran
(74) *Attorney, Agent, or Firm* — Miles & Stockbridge, P.C.

(57) ABSTRACT

[Problem to be Solved] To provide an outline correction processing device capable of achieving an softening effect of sufficiently lightening wrinkles and spots even in a case where wrinkles and spots on a skin of a person captured by a television camera is magnified on display.
[Means of Solving Problem] An outline correction processing device is provided with a first high-pass filter having a function of emphasizing an outline portion of an image signal, and one or more second high-pass filters having a function of weakening the outline portion of the image signal, wherein the first high-pass filter and the second high-pass filters are switched and connected with respect to the image signal being entered, so as to correct an outline portion of a specific color component of the image signal being entered.

5 Claims, 8 Drawing Sheets

(56) References Cited

FOREIGN PATENT DOCUMENTS

| | | | |
|---|---|---|---|
| JP | H11-004452 | A | 1/1999 |
| JP | 2005-033698 | A | 2/2005 |
| JP | 2006-041946 | A | 2/2006 |
| JP | 2007-019593 | A | 1/2007 |
| JP | 2009-182423 | A | 8/2009 |

OTHER PUBLICATIONS

Written Opinion mailed Nov. 1, 2022 in International Application No. PCT/JP2022/033633.

* cited by examiner

FIG. 2

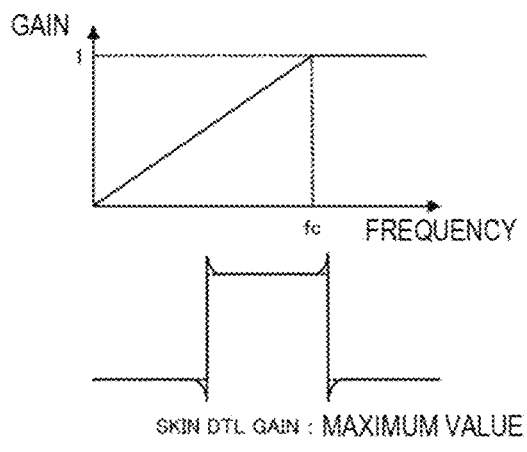

[FREQUENCY CHARACTERISTICS (UPPER) AND RECTANGULAR WAVE RESPONSE CHARACTERISTICS (LOWER) OF HPF]

(DASHED LINE INDICATES INPUT AND SOLID LINE INDICATES OUTPUT IN THE RECTANGULAR WAVE RESPONSE CHARACTERISTICS IN DRAWINGS)

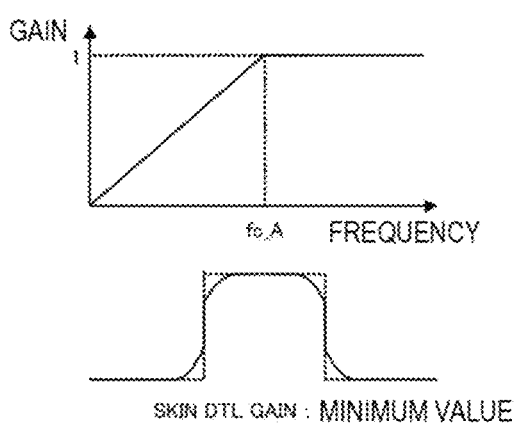

[FREQUENCY CHARACTERISTICS (UPPER) AND RECTANGULAR WAVE RESPONSE CHARACTERISTICS (LOWER) OF HPF_A]

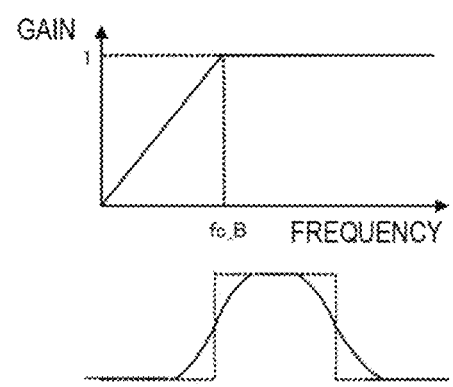

[FREQUENCY CHARACTERISTICS (UPPER) AND RECTANGULAR WAVE RESPONSE CHARACTERISTICS (LOWER) OF HPF_B]

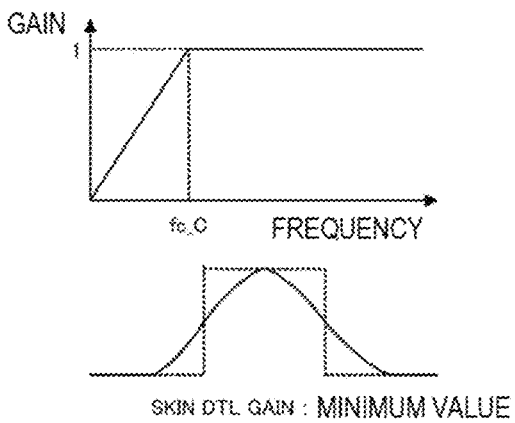

[FREQUENCY CHARACTERISTICS (UPPER) AND RECTANGULAR WAVE RESPONSE CHARACTERISTICS (LOWER) OF HPF_C]

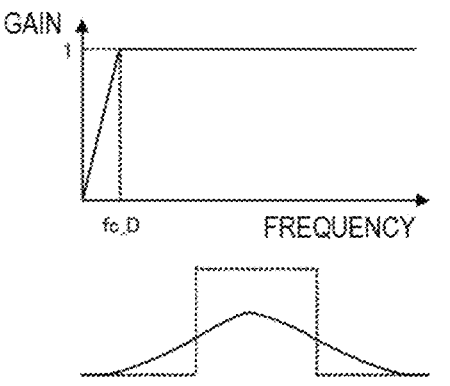

[FREQUENCY CHARACTERISTICS (UPPER) AND RECTANGULAR WAVE RESPONSE CHARACTERISTICS (LOWER) OF HPF_D]

FIG. 3
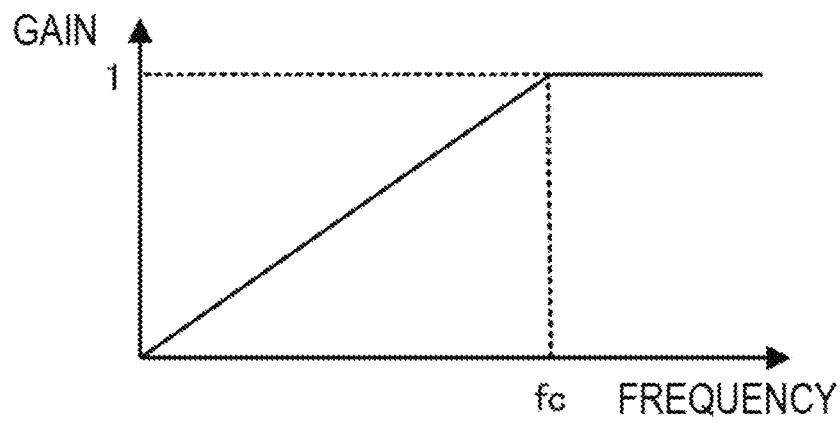
[FREQUENCY CHARACTERISTICS OF HPF]
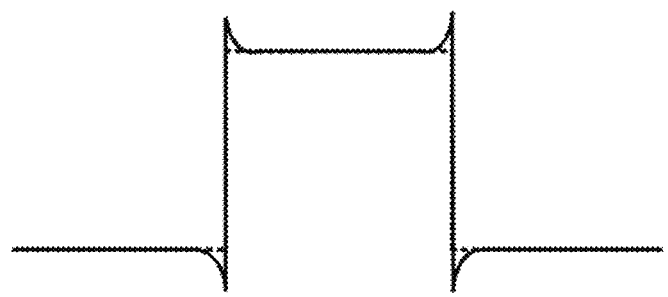
SKIN DTL GAIN : MAXIMUM VALUE = 127
[RECTANGULAR WAVE RESPONSE
CHARACTERISTICS OF HPF]
(DASHED LINE: INPUT, SOLID LINE: OUTPUT)

FIG. 4
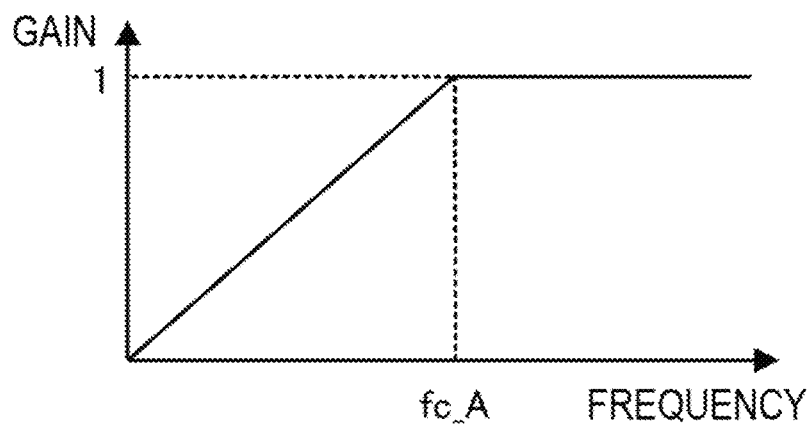
[FREQUENCY CHARACTERISTICS OF HPF_A]
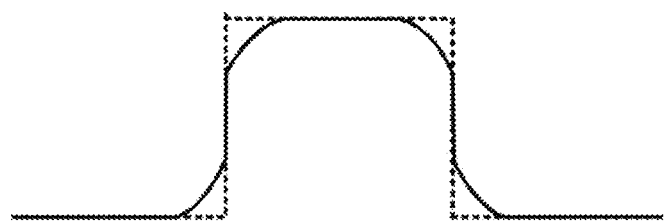
SKIN DTL GAIN : MINIMUM VALUE = -32
[RECTANGULAR WAVE RESPONSE
CHARACTERISTICS OF HPF_A]
(DASHED LINE: INPUT, SOLID LINE: OUTPUT)

FIG. 5
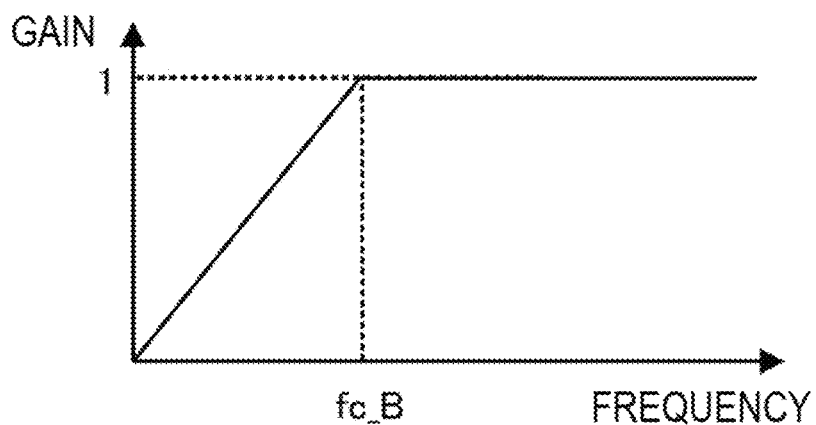
[FREQUENCY CHARACTERISTICS OF HPF_B]
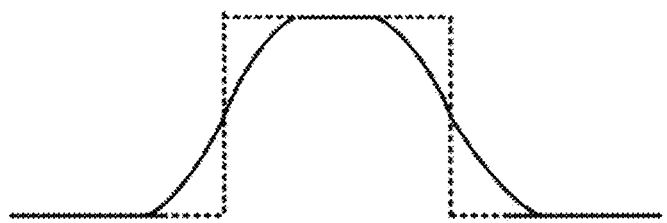
SKIN DTL GAIN : MINIMUM VALUE = -64
[RECTANGULAR WAVE RESPONSE
CHARACTERISTICS OF HPF_B]
(DASHED LINE: INPUT, SOLID LINE: OUTPUT)

FIG. 6
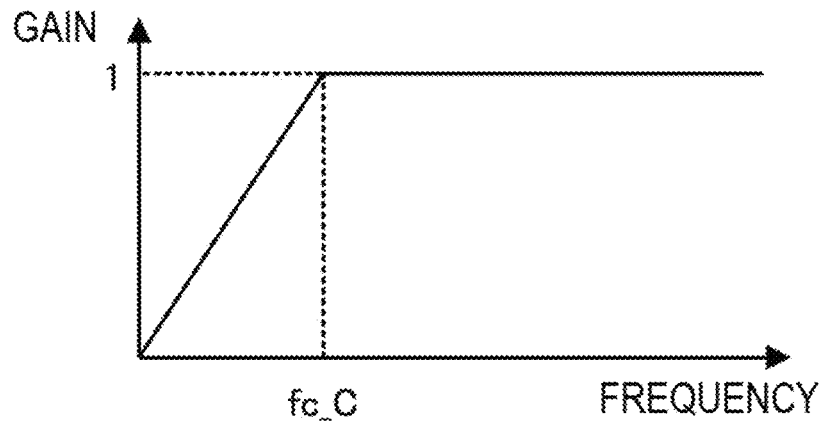
[FREQUENCY CHARACTERISTICS OF HPF_C]
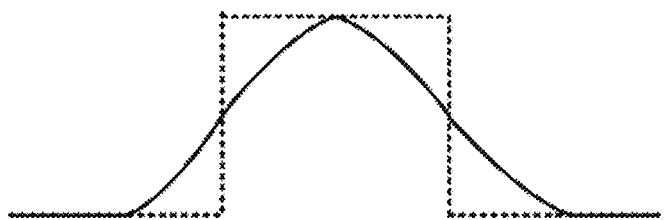
SKIN DTL GAIN : MINIMUM VALUE = -96
[RECTANGULAR WAVE RESPONSE
CHARACTERISTICS OF HPF_C]
(DASHED LINE: INPUT, SOLID LINE: OUTPUT)

FIG. 7
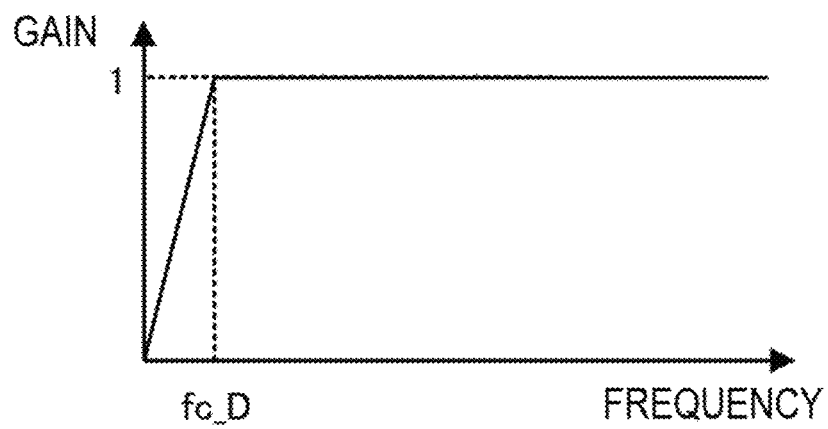
[FREQUENCY CHARACTERISTICS OF HPF_D]
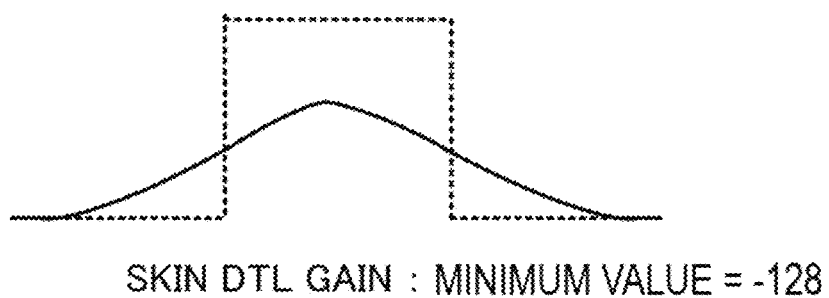
SKIN DTL GAIN : MINIMUM VALUE = -128
[RECTANGULAR WAVE RESPONSE
CHARACTERISTICS OF HPF_D]
(DASHED LINE: INPUT, SOLID LINE: OUTPUT)

OUTLINE CORRECTION PROCESSING DEVICE AND OUTLINE CORRECTION PROCESSING METHOD

TECHNICAL FIELD

The present invention relates to an outline correction processing device and an outline correction processing method regarding an image captured by a television camera and the like.

BACKGROUND ART

Recently, 4K television cameras in which a number of pixels (3840×2160) is four times the conventional High Definition (HD: 1920×1080) cameras are being used widely, and definition of images are being enhanced.

Meanwhile, wrinkles and spots on a skin of a person is also enhanced, which may be unsuited on high definition images according to some circumstances, such that an outline correction technique, referred to as a skin tone detail, is of importance as a technique for shading off an outline of only a specific color component, such as skin tone.

Regarding the outline correction technique, for example, Patent Document 1 discloses an outline correction circuit in which a circuit that extracts an outline portion from an input image signal and adds the same to an image signal to emphasize the outline, and a circuit that adds a signal having an opposite polarity of the extracted outline portion to the image signal to soften the outline, are switched consecutively in volumes.

The outline correction circuit disclosed in Patent Document 1 is an analog circuit, and FIG. 8 illustrates in block configuration the outline correction circuit equivalently in a digital circuit.

In FIG. 8, an outline extraction circuit composed of a delay line and an operational amplifier is represented by a high-pass filter (HPF) 1, and an outline component being extracted is increased or decreased according to a detail gain by a multiplier 2. In addition, when the detail gain is a positive number, that is, when the outline is to be emphasized, a + side is selected in a selector (SEL) 4, and when the detail gain is a negative number, that is, when the outline is to be softened, a-side is selected in the selector (SEL) 4 through a polarity inverter 3. Lastly, the output of the selector (SEL) 4 is added to the image signal at an adder 5, and the outline correction processing is completed.

CITATION LIST

Patent Document

[Patent Document 1] Japanese Patent Application Laid-Open Publication No. H08-294020

SUMMARY OF INVENTION

Problems to Be Solved by the Invention

According to the outline correction circuit illustrated in FIG. 8, emphasizing and softening of outline is performed in a single outline extraction circuit, such that when outline extraction is performed at a frequency band that emphasizes a normal outline, which is around a few tens of MHz, a softening performed thereby becomes insufficient. For example, if a person is captured on a zoomed-up image, the distance between wrinkles on the skin may be widened or the spots on the skin may be enlarged, such that there was a drawback that wrinkles and spots were not sufficiently defocused.

An object of the present invention is to provide an outline correction technique of enabling sufficient softening effect on wrinkles and spots on the skin, even in a zoomed-up image.

Means of Solving the Problems

Therefore, one aspect of an outline correction processing device according to the present invention includes a first high-pass filter having a function of emphasizing an outline portion of an image signal, and one or more second high-pass filters having a function of weakening the outline portion of the image signal, wherein the first high-pass filter and the second high-pass filter are switched and connected with respect to the image signal being entered, so as to correct an outline portion of a specific color component of the image signal being entered.

Effects of Invention

As described above, according to the present invention, a sufficient softening effect may be obtained when the detail gain is a negative number, and an impact caused when the detail gain is switched from a positive number to a negative number may be relieved, such that an effect in that the outline is gradually softened according to an absolute value of negative number of the detail gain may be obtained.

The problems, configurations, and effects other than those described above will become apparent from the description of an embodiment for carrying out the present invention described hereafter.

BRIEF DESCRIPTION OF DRAWINGS

FIG. 2 is a view collectively illustrating frequency characteristics and rectangular wave response characteristics for each of five high pass filters HPF and HPF_A to HPF_D used in the outline correction processing device.

FIG. 3 is a view illustrating the frequency characteristics and the rectangular wave response characteristics of the high-pass filter HPF.

FIG. 4 is a view illustrating the frequency characteristics and the rectangular wave response characteristics of the high-pass filter HPF_A.

FIG. 5 is a view illustrating the frequency characteristics and the rectangular wave response characteristics of the high-pass filter HPF_B.

FIG. 6 is a view illustrating the frequency characteristics and the rectangular wave response characteristics of the high-pass filter HPF_C.

FIG. 7 is a view illustrating the frequency characteristics and the rectangular wave response characteristics of the high-pass filter HPF_D.

MODE FOR CARRYING OUT THE INVENTION

An embodiment for carrying out the present invention will be described below with reference to the drawings. The embodiment is not intended to limit the scope of the present invention.

Embodiment

Figure 1:
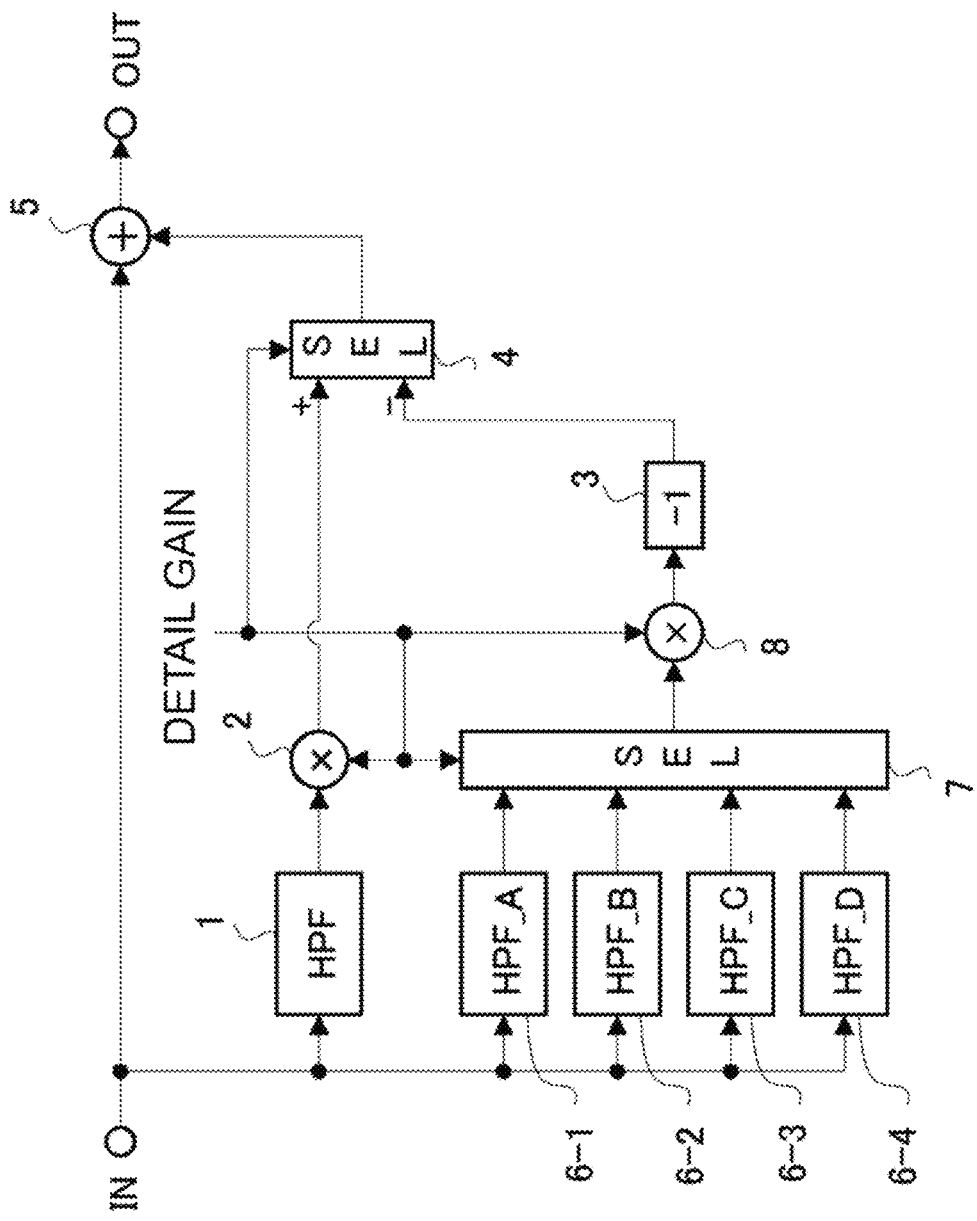
FIG. 1 is a view illustrating one example of a block configuration of an outline correction processing device according to the present invention.
Figure 8:
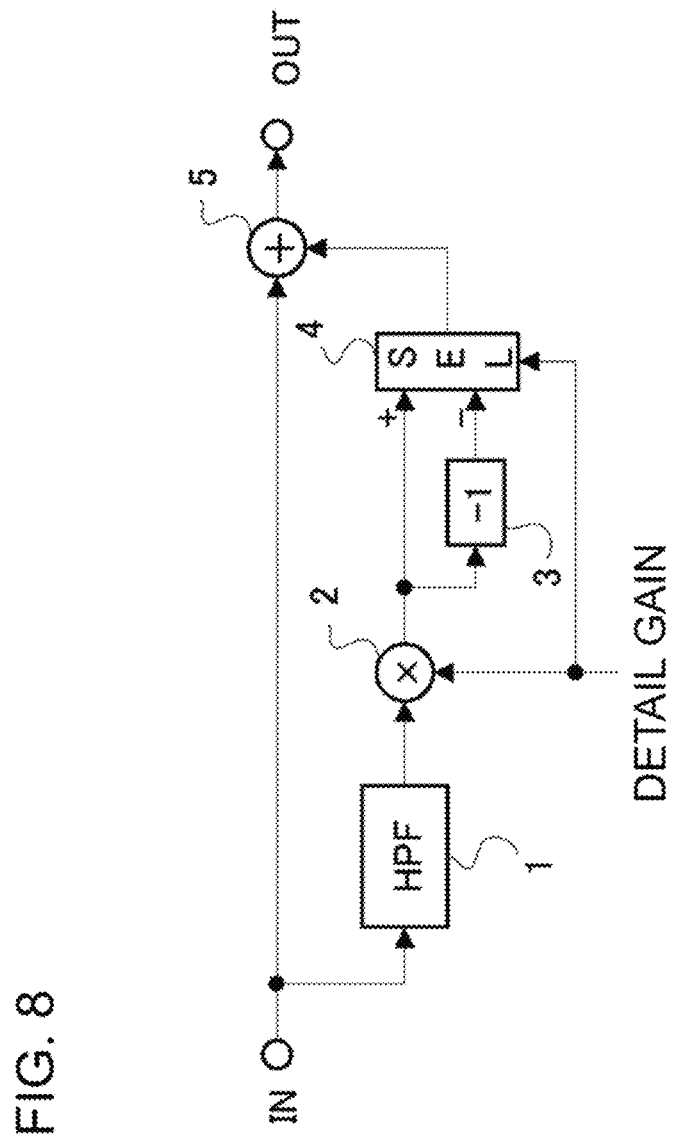
FIG. 8 is a view illustrating one example of a block configuration of an outline correction processing device according to a prior art technique.

FIG. 1 is a view illustrating one example of a block configuration of an outline correction processing device according to the present invention.

An outline correction processing device according to the present invention is applicable both to an image signal during video recording and to an image signal during reproduction as an input signal.

The outline correction processing device illustrated in FIG. 1 performs an outline extraction using high-pass filters HPF1 and HPF_A to D (6-1 to 6-4) with respect to the image signals being entered. The high-pass filters HPF, hereinafter simply referred to as HPF, being used may be two or more filters assembled arbitrarily, and the number of the filters is not limited to five.

At first, frequency characteristics and rectangular wave response characteristics of each of the five HPFs mentioned above will be described.

FIGS. 2 to 7 are each a view illustrating frequency characteristics and rectangular wave response characteristics of each of HPF1 and HPF_A to D (6-1 to 6-4). Among these views, FIG. 2 collectively illustrates the frequency characteristics and the rectangular wave response characteristics of each of HPF1 and HPF_A to D (6-1 to 6-4) for comparison. As for the rectangular wave response characteristics illustrated in FIGS. 2 to 7, inputs are shown by dashed lines (all are rectangular wave inputs) and outputs are shown by solid lines.

HPF1 and HPF_A to D (6-1 to 6-4) are set in the order of HPF_D (6-4)>HPF_C (6-3)>HPF_B (6-2)>HPF_A (6-1)>HPF1 regarding the cutoff frequency (fc) of the filter from low to high, that is, the softening effect, or effect to shade off the outline, from high to low.

FIG. 3 is a view illustrating the frequency characteristics and the rectangular wave response characteristics of HPF1.

HPF1 has the highest cutoff frequency (fc) among the five filters regarding the frequency characteristics, and has an output that has a sharp response to change, i.e., enhances the outline, regarding the rectangular wave response characteristics (with the detail gain set to the maximum value).

FIGS. 4 to 7 respectively illustrate the frequency characteristics and the rectangular wave response characteristics of HPF_A (6-1) to HPF_D (6-4).

As for the frequency characteristics, the cutoff frequency (fc_A to fc_D) becomes lower from HPF_A (6-1) to HPF_D (6-4) in the named order.

As for the rectangular wave response characteristics, the response to change becomes gentler and the softening effect, i.e., effect to shade off the outline, becomes greater from HPF_A (6-1) to HPF_D (6-4) in the named order (with detail gains respectively set to the minimum value of the corresponding gain width).

Returning to the block configuration of FIG. 1, one output is selected from the outputs of HPF1 or HPF_A to D (6-1 to 4) in response to the detail gain. For example, a variable range of the detail gain is set to −128 to +127. However, the variable range is not limited to this range, and may be set arbitrarily.

Next, selectors (SEL) 4 and 7 are operated as described below in response to the value of the detail gain, and the HPF1 and HPF_A to D (6-1 to 4) are selected. The selection example of the detail gain value, i.e., interval width of detail gain, described below is merely an example, and the value is not limited to those described below.

(1) When Detail Gain Is From 0 to +127

The output of HPF1 is multiplied by the detail gain in the multiplier 2, and since the detail gain is a positive value of 0 or greater, the + side is selected in the selector (SEL) 4.

Thereby, the output from the selector (SEL) 4 is an integration of the output of HPF1 and the detail gain.

(2) When Detail Gain Is From −32 to −1

Based on the value and sign of the detail gain, the output of HPF_A (6-1) is selected in the selector (SEL) 7 and the − side is selected in the selector (SEL) 4.

Thereby, the output of HPF_A (6-1) is multiplied by the detail gain in the multiplier 8 and output via the polarity inverter 3 from the selector (SEL) 4.

(3) When Detail Gain Is From −64 to −33

Based on the value and sign of the detail gain, the output of HPF_B (6-2) is selected in the selector (SEL) 7 and the − side is selected in the selector (SEL) 4.

Thereby, the output of HPF_B (6-2) is multiplied by the detail gain in the multiplier 8 and output via the polarity inverter 3 from the selector (SEL) 4.

(4) When Detail Gain Is From −96 to −65

Based on the value and sign of the detail gain, the output of HPF_C (6-3) is selected in the selector (SEL) 7 and the − side is selected in the selector (SEL) 4.

Thereby, the output of HPF_C (6-3) is multiplied by the detail gain in the multiplier 8 and output via the polarity inverter 3 from the selector (SEL) 4.

(5) When Detail Gain Is From −128 to −9

Based on the value and sign of the detail gain, the output of HPF_D (6-4) is selected in the selector (SEL) 7 and the − side is selected in the selector (SEL) 4.

Thereby, the output of HPF_D (6-4) is multiplied by the detail gain in the multiplier 8 and output via the polarity inverter 3 from the selector (SEL) 4.

Lastly, the output of the selector (SEL) 4 is added to the original image signal in the adder 5, and the outline correction processing is completed.

According to the outline correction processing of the present invention, a plurality of HPFs having different frequency characteristics and rectangular wave response characteristics are provided, such that the frequency bands may be switched from high frequency to low frequency as the absolute value of the negative number of detail gain increases, to prevent the image from suddenly becoming too soft in an awkward manner when the detail gain is switched from the positive number to the negative number.

By executing the outline correction processing described above, it becomes possible to weaken the outline portion of the wrinkles and spots on a skin of a person, for example, and to lighten the dark colors.

In contrast, by performing correction to emphasize the outline portion, it may be applied to emphasizing wrinkles, for example, to correspond to playing roles of an elderly person.

As described, by using a television camera that adopts the outline correction processing device according to the present invention, even during a real-time broadcasting, such as in a live broadcast, it may be possible to transmit an image captured by camera to a processed image provided with the outline correction processing.

The embodiments of the present invention have been described above, but the present invention is not limited to the embodiments described above, and various modifications are enabled within the scope of the present invention.

DESCRIPTION OF THE REFERENCE NUMERAL

1, 6-1, 6-2, 6-3, 6-4: high-pass filter (HPF), 2, 8: multiplier, 3: polarity inverter, 4,7: selector (SEL), 5: adder

The invention claimed is:

1. An outline correction processing device comprising:
a first high-pass filter having a function of emphasizing an outline portion of an image signal; and
one or more second high-pass filters having a function of weakening the outline portion of the image signal,
wherein the first high-pass filter and the second high-pass filters are switched and connected with respect to the image signal being entered, in a case where a correction gain with respect to the image signal is zero or positive, connection to the first high-pass filter is performed, and in a case where the correction gain is negative, connection to the second high-pass filter is performed so as to correct an outline portion of a specific color component of the image signal being entered.

2. The outline correction processing device according to claim 1,
wherein the number of the second high-pass filters is two or more with each second high-pass filter having different cutoff frequencies, and
wherein, in a case where the correction gain is negative and an absolute value is increased, switching is performed among the second high-pass filters to a filter having a lower cutoff frequency so as to further weaken the outline portion.

3. The outline correction processing device according to claim 1,
wherein the specific color component is a component indicating a skin tone of a person.

4. The outline correction processing device according to claim 2,
wherein the specific color component is a component indicating a skin tone of a person.

5. An outline correction processing method comprising:
in a case where a correction gain with respect to an image signal is zero or positive, outputting an entered image signal through a high-pass filter having a function of emphasizing an outline portion of the image signal; and
in a case where the correction gain is negative, outputting the entered image signal through a second high-pass filter, the second high-pass filter being switched among a plurality of second high-pass filters having a function of weakening the outline portion of the image signal, in response to a magnitude of an absolute value of the correction gain,
to thereby correct an outline portion of a specific color component of the image signal being entered.

* * * * *